(12) United States Patent
Minami et al.

(10) Patent No.: US 12,740,508 B2
(45) Date of Patent: Sep. 22, 2026

(54) LAWN MOWER

(71) Applicant: HONDA MOTOR CO., LTD., Tokyo (JP)

(72) Inventors: Fumio Minami, Wako (JP); Tatsuya Yamazaki, Wako (JP); Taichi Kubota, Wako (JP); Yuko Nishi, Wako (JP); Shin Murakami, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 698 days.

(21) Appl. No.: 18/169,430

(22) Filed: Feb. 15, 2023

(65) Prior Publication Data

US 2024/0268261 A1 Aug. 15, 2024

(51) Int. Cl.
*A01D 34/68* (2006.01)
*A01D 34/00* (2006.01)
*A01D 34/81* (2006.01)
*A01D 101/00* (2006.01)

(52) U.S. Cl.
CPC ....... *A01D 34/6806* (2013.01); *A01D 34/006* (2013.01); *A01D 34/81* (2013.01); *A01D 2101/00* (2013.01)

(58) Field of Classification Search
CPC .. A01D 34/6806; A01D 34/006; A01D 34/81; A01D 34/71; A01D 34/66; A01D 34/828; A01D 34/685; A01D 42/005; A01D 57/30
See application file for complete search history.

(56) References Cited

U.S. PATENT DOCUMENTS 3,369,350 A * 2/1968 Rogers ............... A01D 34/8355 56/503
3,496,707 A * 2/1970 Kobey ................... A01D 34/63 56/17.5
5,657,620 A * 8/1997 Thagard ................. A01D 34/64 56/320.1
5,732,540 A 3/1998 Samejima et al.
6,178,729 B1 * 1/2001 Vastag ................. A01D 34/005 56/255
2020/0305345 A1 10/2020 Kelly
2023/0086965 A1 * 3/2023 Mccutcheon IV ... A01D 34/006 56/10.2 A

FOREIGN PATENT DOCUMENTS

JP 3582878 B2 10/2004

* cited by examiner

*Primary Examiner* — Matthew Troutman
*Assistant Examiner* — Robert E Pezzuto
(74) *Attorney, Agent, or Firm* — Rankin, Hill & Clark LLP

(57) ABSTRACT

A lawn mower includes: a cutter blade configured to cut lawn grass; a drive source configured to rotate the cutter blade; a blade accommodating portion that is configured to accommodate the cutter blade and is provided with an opening in a rear portion thereof; and a lid portion provided at the opening in an openable and closable manner.

11 Claims, 10 Drawing Sheets

10
12
14(141)
14(142)
16(161)
18
20
22
24
26
28
30
32
60
III
X1
X2
Y1
Y2
Z1
Z2
X
Y
Z

LAWN MOWER

BACKGROUND OF THE INVENTION

Field of the Invention

The present invention relates to a lawn mower.

Description of the Related Art

US 2020/0305345 A1 discloses a lawn mower. The lawn mower discharges grass clippings to the side or rear of the lawn mower.

SUMMARY OF THE INVENTION

There is a long-awaited need for a lawn mower capable of more efficiently mowing lawn grass.

An object of the present invention is to solve the above-mentioned problem.

According to an aspect of the present invention, there is provided a lawn mower, comprising: a cutter blade configured to cut lawn grass; a drive source configured to rotate the cutter blade; a blade accommodating portion that is configured to accommodate the cutter blade and is provided with an opening in a rear portion thereof; and a lid portion provided at the opening in an openable and closable manner.

According to the present invention, a lawn mower capable of more efficiently mowing lawn grass is provided.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4 is a schematic view showing the configuration of the lawn mower;

FIG. 5 is a schematic view showing the configuration of the lawn mower;

FIG. 6 is a perspective view showing a lid portion;

DETAILED DESCRIPTION OF THE INVENTION

Embodiment

Figure 1:
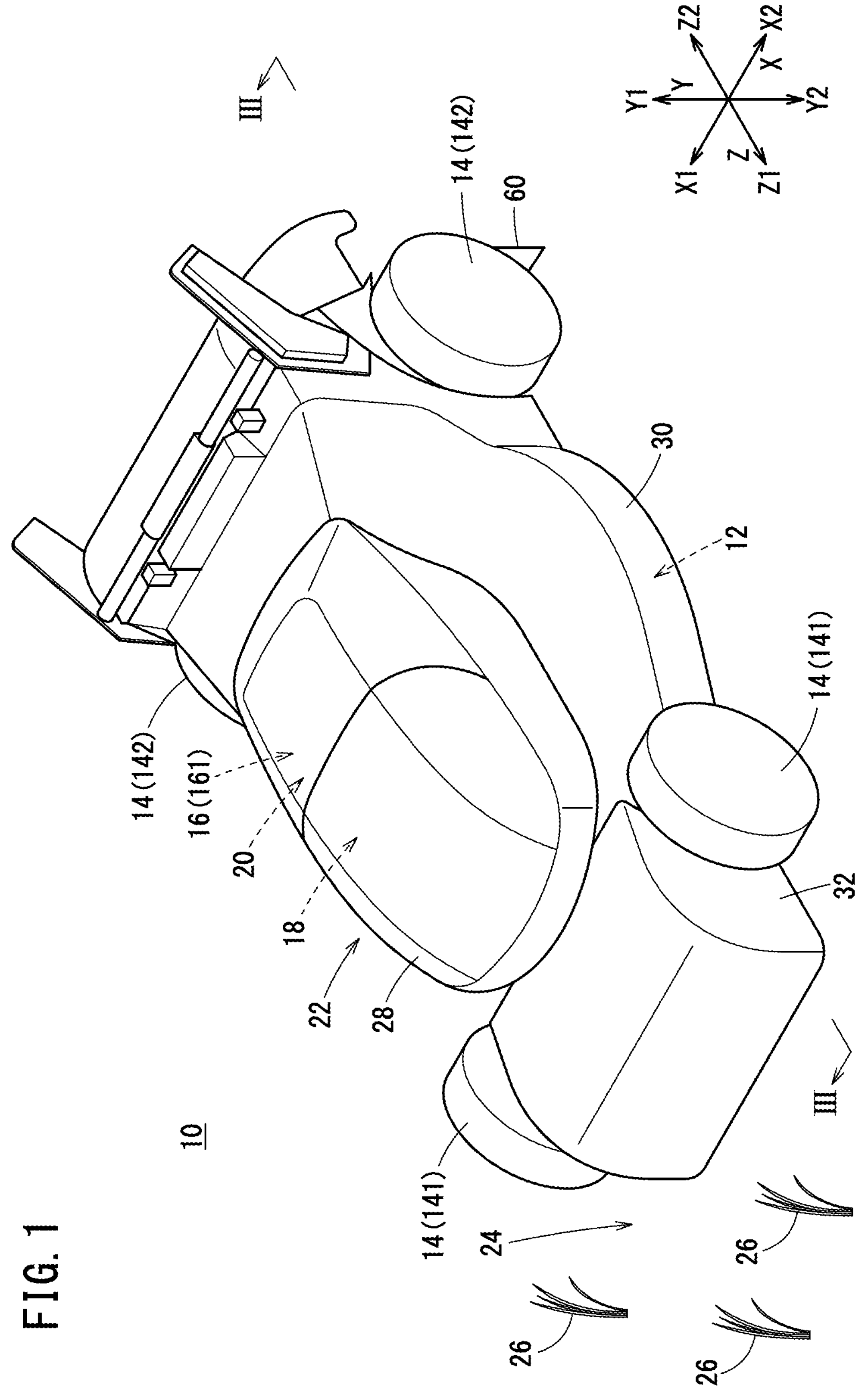
FIG. 1 is a perspective view showing a lawn mower according to an embodiment.
Figure 2:
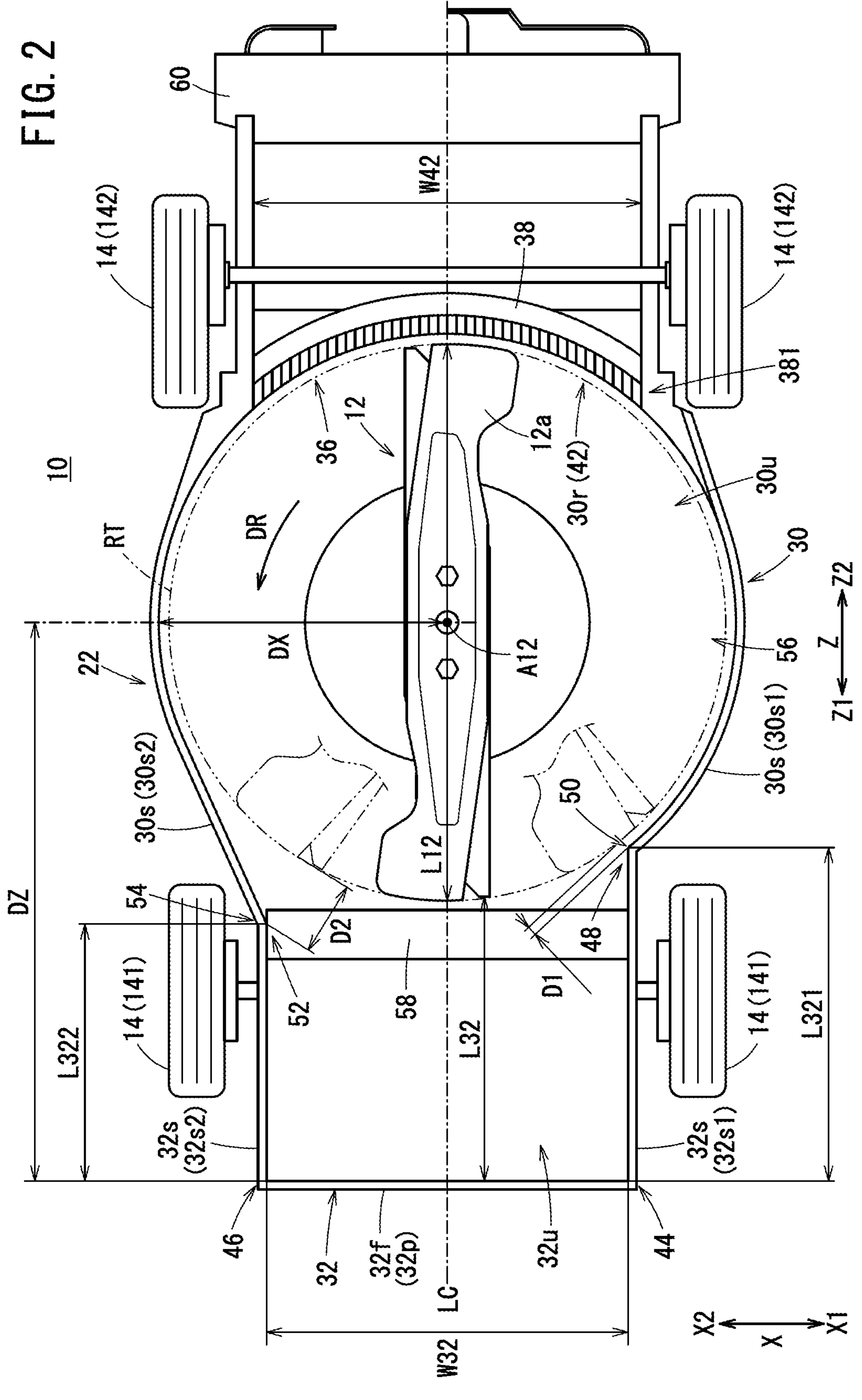
FIG. 2 is a bottom view of the lawn mower.
Figure 3:
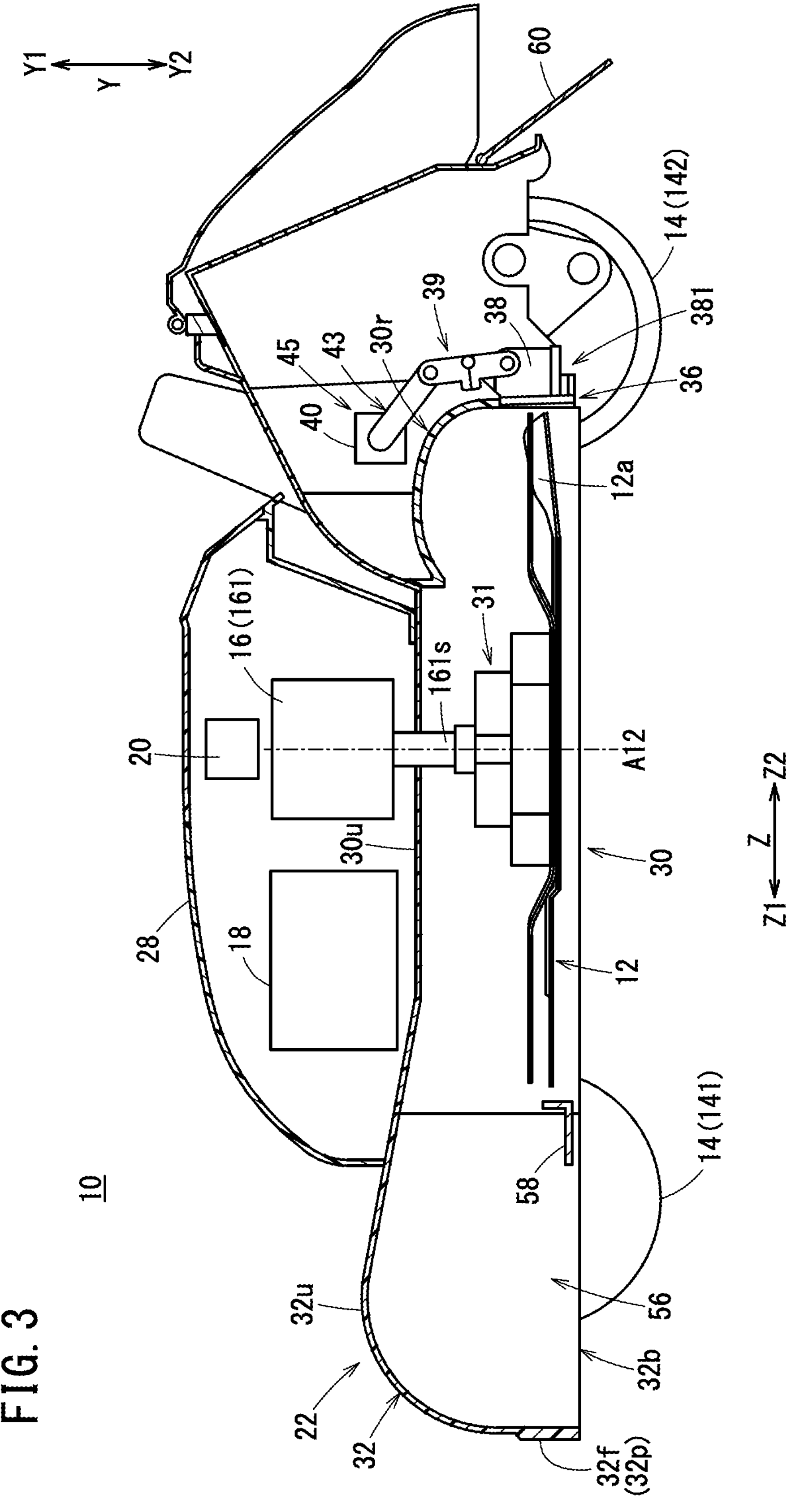
FIG. 3 is a cross-sectional view of the lawn mower.

A lawn mower according to an embodiment of the present invention will be described below with reference to the drawings. FIG. 1 is a perspective view showing a lawn mower 10 according to the embodiment. FIG. 2 is a bottom view of the lawn mower 10. FIG. 3 is a cross-sectional view of the lawn mower 10. The cross-sectional view of FIG. 3 is taken along line III-III of FIG. 1.

The lawn mower 10 is a machine for cutting lawn grass 26 using a cutter blade 12. In the present embodiment, a case where the lawn mower 10 is a rotary lawn mower will be described as an example, but the lawn mower 10 is not limited thereto. As shown in FIG. 3, the lawn mower 10 includes the cutter blade 12, a plurality of wheels 14, a drive source 16, a battery 18, a control unit 20, and a housing 22. The cutter blade 12, the drive source 16, the battery 18, and the control unit 20 are accommodated in the housing 22.

In the present embodiment, four wheels 14 (141, 142) are provided on the lawn mower 10. The four wheels 14 include two front wheels 141 and two rear wheels 142. The lawn mower 10 can travel on a traveling surface 24 by rotation of the four wheels 14. The number of the wheels 14 provided on the lawn mower 10 is not limited to four.

The drive source 16 includes a work motor 161. The work motor 161 is a first motor for rotationally driving the cutter blade 12. The work motor 161 includes a shaft 161*s*. The shaft 161*s* extends in a downward direction Y2. The shaft 161*s* is rotationally driven by using the battery 18. The drive source 16 further includes a traction motor (not shown). The traction motor (not shown) is a second motor for driving the wheels 14. The shaft of the traction motor (not shown) is driven by using the battery 18.

The control unit 20 is a computer that controls the lawn mower 10. The control unit 20 includes, for example, a processor and a memory. The memory stores a computer-executable program. The processor controls the lawn mower 10 by executing the program stored in the memory. For example, the processor controls the above-described drive source 16 based on the program. As a result, the control unit 20 can drive the cutter blade 12 and the wheels 14. At least a part of the control unit 20 may be configured by an integrated circuit, a discrete device, or the like.

The cutter blade 12 may be provided with a single blade member or may be provided with a plurality of blade members. The cutter blade 12 is provided at a lower portion of the lawn mower 10.

The cutter blade 12 is driven by the work motor 161. As described above, the lawn mower 10 of the present embodiment is a rotary lawn mower. Therefore, the cutter blade 12 is a rotary blade. The cutter blade 12 rotates in response to driving of the work motor 161. As a result, the lawn grass 26 growing on the traveling surface 24 of the lawn mower 10 is cut by the cutter blade 12.

A rotation axis A12 of the cutter blade 12 extends in an up-down direction Y of the lawn mower 10. The up-down direction Y (Y1, Y2) is a direction intersecting a front-rear direction Z (Z1, Z2). The up-down direction Y and the front-rear direction Z are orthogonal to each other.

A rotation direction DR of the cutter blade 12 is determined in advance based on the orientation of the edge of the cutter blade 12. Therefore, the rotation direction DR of the cutter blade 12 is not limited to the direction indicated by the arrow shown in FIG. 2.

The cutter blade 12 includes a wing portion 12*a* (see also FIG. 3). The wing portion 12*a* generates an airflow A1 (see FIG. 8) flowing in the upward direction Y1 in accordance with the rotation of the cutter blade 12. The airflow A1 causes the tip portion of the lawn grass 26 growing on the traveling surface 24 of the lawn mower 10 to stand vertically. Accordingly, the lawn grass 26 can easily come into contact with the rotating cutter blade 12. In other words, the lawn grass 26 can be easily cut by the cutter blade 12.

The housing 22 includes a motor accommodating portion 28, a blade accommodating portion 30, and a protruding portion 32. In the present embodiment, a case where the motor accommodating portion 28, the blade accommodating portion 30, and the protruding portion 32 are separate members will be described. However, the motor accommodating portion 28, the blade accommodating portion 30, and the protruding portion 32 may be integrally formed.

The motor accommodating portion 28 accommodates the drive source 16. The motor accommodating portion 28 can further accommodate the battery 18 and the control unit 20.

The blade accommodating portion 30 is located below the motor accommodating portion 28. The blade accommodating portion 30 accommodates the cutter blade 12. Further, the blade accommodating portion 30 covers a predetermined range around the cutter blade 12 to limit the scattering range of grass clippings 34. The grass clippings 34 are fragments of the lawn grass 26 cut by the cutter blade 12 (see also FIGS. 5 and 8). The shape of the blade accommodating portion 30 in top view or bottom view is a circular shape or a substantially circular shape as shown in FIG. 2, but the shape of the blade accommodating portion 30 is not limited thereto. The blade accommodating portion 30 includes two side wall portions 30*s* (30*s*1, 30*s*2), an upper wall portion 30*u*, and a rear portion 30*r* (see also FIGS. 2 and 3).

The two side wall portions 30*s* face each other in a width direction X (X1, X2) of the lawn mower 10. The width direction X is a direction intersecting the front-rear direction Z and the up-down direction Y. The width direction X is orthogonal to the front-rear direction Z and is orthogonal to the up-down direction Y. The cutter blade 12 is arranged between the two side wall portions 30*s*.

The upper wall portion 30*u* is located above the cutter blade 12. In the present embodiment, the upper wall portion 30*u* also serves as the bottom portion of the motor accommodating portion 28, but the present invention is not limited thereto. The above-described shaft 161*s* passes through the upper wall portion 30*u* and is connected to the cutter blade 12. The shaft 161*s* and the cutter blade 12 are connected to each other via an attachment member 31. The upper wall portion 30*u* connects the two side wall portions 30*s* and the rear portion 30*r*. The two side wall portions 30*s*, the rear portion 30*r*, and the upper wall portion 30*u* may be integrally formed.

A discharge unit 36 is provided at the rear portion 30*r* of the blade accommodating portion 30. The discharge unit 36 includes a lid portion 38 and an actuator 45 (see also FIGS. 4 and 5). The actuator 45 includes a toggle link mechanism 39 and a motor 40. An opening 42 (see FIG. 5) for discharging the grass clippings 34 rearward is formed in the rear portion 30*r* of the blade accommodating portion 30.

It is preferable that a width W42, which is the dimension of the opening 42 (the discharge unit 36) in the width direction X, is relatively large. Specifically, the width W42 is preferably one half or more of a cutting range of the cutter blade 12 in the width direction X. That is, the width W42 is preferably one half or more of a dimension L12 of the cutter blade 12 in the longitudinal direction. By setting the width W42 to be relatively large in this manner, it becomes easier for the grass clippings 34 to pass through the opening 42.

The width W42 of the opening 42 may be greater than a width W32 which is the dimension of the protruding portion 32 in the width direction X.

The opening 42 is preferably located between the two wheels 14 (the rear wheels 142). With this configuration, the lawn mower 10 can be configured to be compact.

The lid portion 38 covers the opening 42 in an openable and closable manner. The lid portion 38 is curved to correspond to a rotation trajectory RT of the cutter blade 12 (FIG. 2). That is, the inner surface of the lid portion 38 is formed along the rotation trajectory RT. Such surface of the lid portion 38 includes an arc constituting a part of an imaginary circle centered on the rotation axis (A12). With this configuration, it is possible to reduce the risk that the grass clippings 34 flowing in the blade accommodating portion 30 will get jammed between the blade accommodating portion 30 and the lid portion 38.

When the lid portion 38 is in a closed state, the inner wall surface of the lid portion 38 and the inner wall surface of the blade accommodating portion 30 are flush with each other (FIG. 2). That is, the lid portion 38 does not protrude inward with respect to the blade accommodating portion 30. With this configuration, it is possible to further reduce the risk that the grass clippings 34 flowing in the blade accommodating portion 30 will get jammed between the blade accommodating portion 30 and the lid portion 38.

Figure 4:
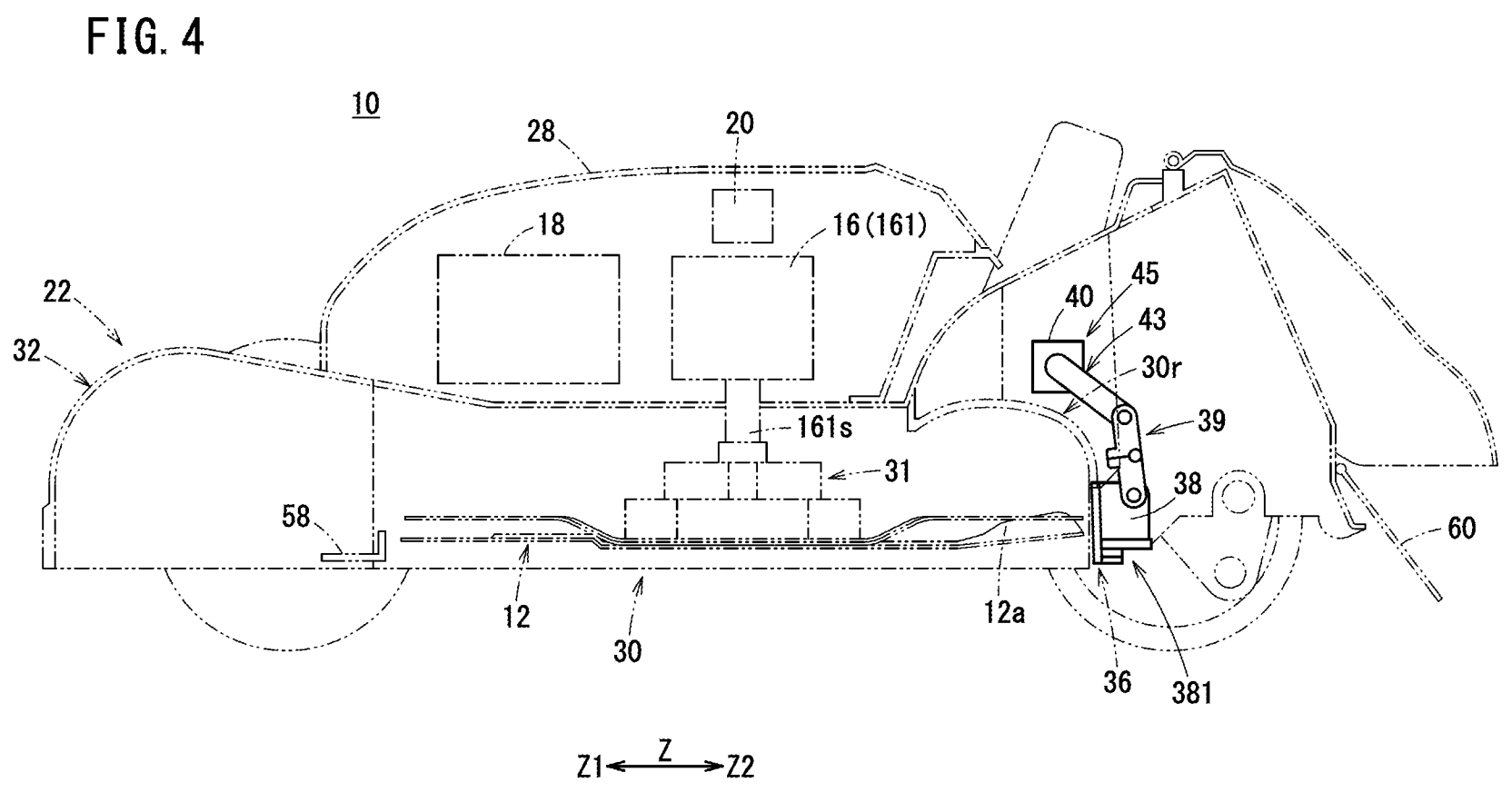
Figure 5:
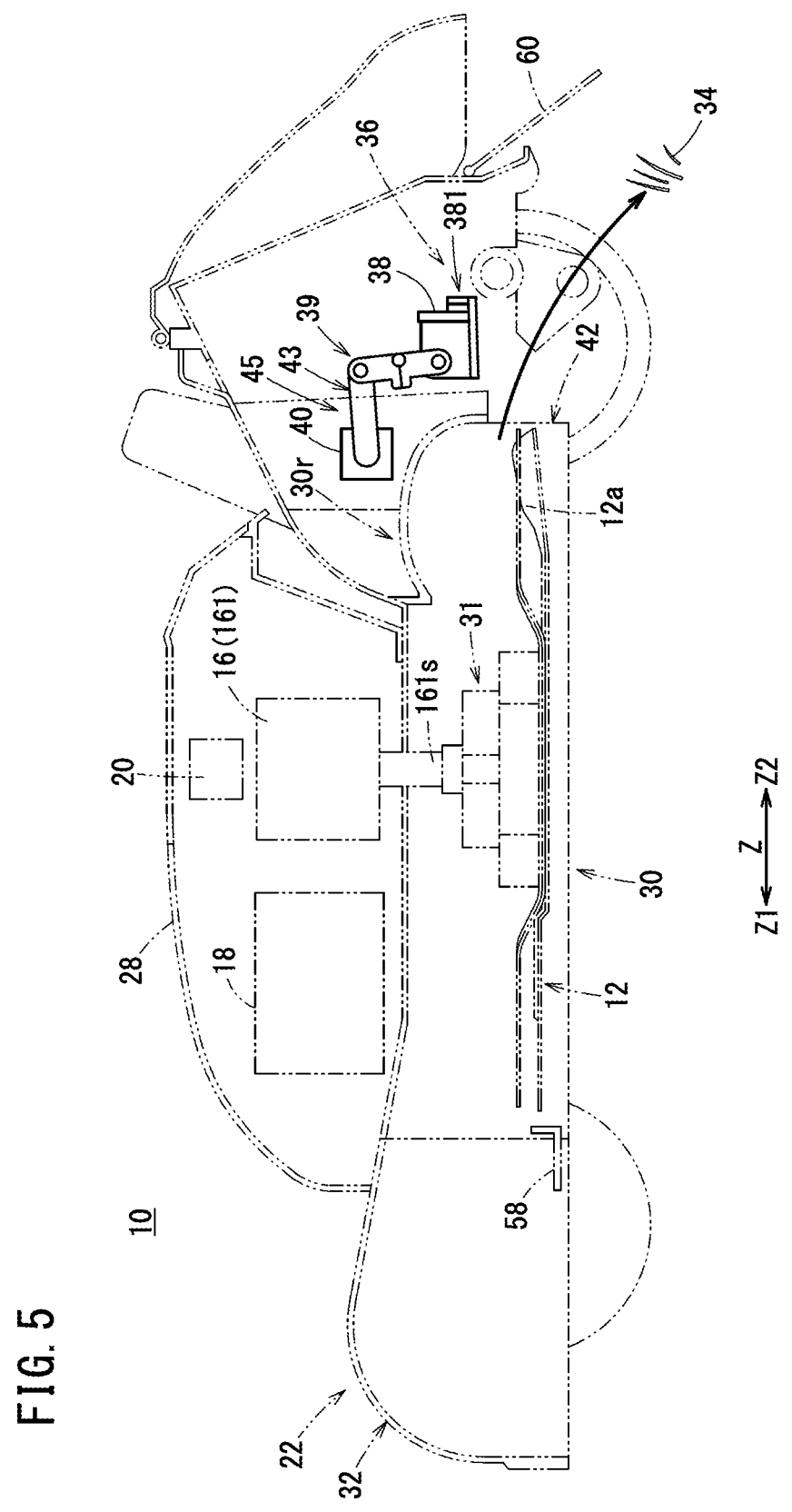
Figure 6:
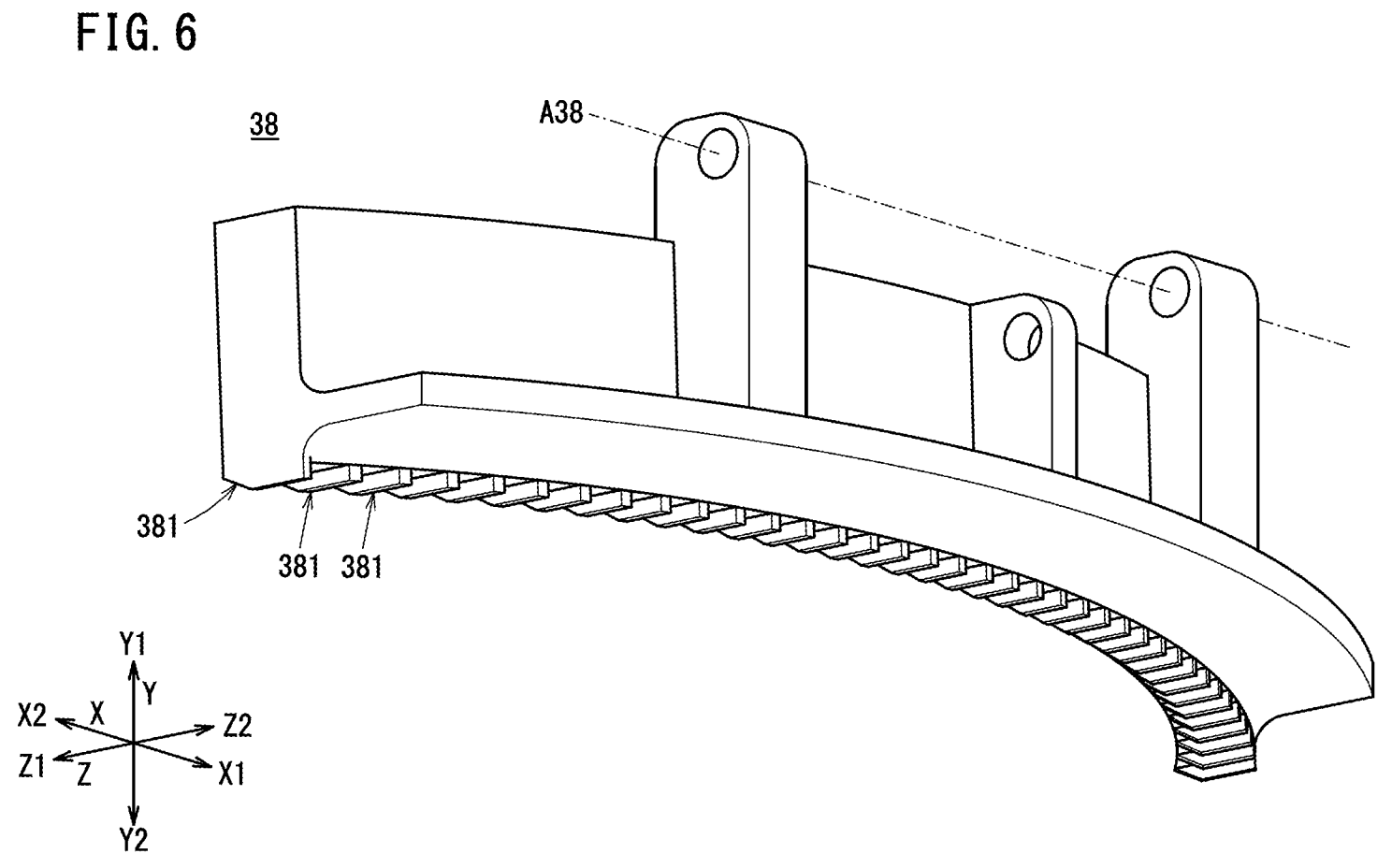

Each of FIGS. 4 and 5 is a schematic view of the lawn mower 10. FIG. 6 is a perspective view showing the lid portion 38.

The motor 40 is connected to the lid portion 38 via the toggle link mechanism 39. In response to the driving of the motor 40, the lid portion 38 rotates about a rotation axis A38 extending in the width direction X of the lawn mower 10. The opening degree of the lid portion 38 changes according to the driving amount of the motor 40. Incidentally, the motor 40 can be controlled by the control unit 20 described above. The control unit 20 will be described in more detail later.

The lid portion 38 in the closed state is shown in FIGS. 4 and 6. The lid portion 38 is provided with a plurality of protrusions 381. The plurality of protrusions 381 are arranged at intervals in the width direction X. The plurality of protrusions 381 protrude downward from the lid portion 38 when the lid portion 38 is in the closed state.

The plurality of protrusions 381 protruding downward can comb the lawn grass 26 while the lawn mower 10 is moving forward. As a result, the appearance of grass surfaces 26*s*1 (see also FIG. 6) after mowing with the lawn mower 10 can be improved.

The protrusions 381 preferably extend in the front-rear direction Z. Since the dimension of the protrusions 381 in the front-rear direction Z is relatively large, the lawn grass 26 can be combed more suitably as the lawn mower 10 moves forward.

The lawn mower 10 with the lid portion 38 open is shown in FIG. 5. When the lawn mower 10 moves forward with the lid portion 38 open, the grass clippings 34 in the blade accommodating portion 30 are discharged in the rearward direction Z2 through the opening 42. As the opening degree of the lid portion 38 is increased, the amount of the discharged grass clippings 34 is increased.

The load applied to the cutter blade 12 is a resistance force that the cutter blade 12 receives from an object to be cut, such as the lawn grass 26 or the grass clippings 34, when cutting the object to be cut. As the amount of the object to be cut staying in the blade accommodating portion 30 increases, the load can increase. The load applied to the cutter blade 12 can be reduced by discharging the grass clippings 34 in the blade accommodating portion 30. By reducing the load applied to the cutter blade 12, the power consumption of the work motor 161 can be suppressed. Thus, the power consumption of the lawn mower 10 can be suppressed.

As described above, the motor 40 can be controlled by the control unit 20. The control unit 20 can control the motor 40 to change the opening degree of the lid portion 38 such that an excessive load is not applied to the cutter blade 12.

The control unit 20 changes the opening degree of the lid portion 38 based on, for example, information indicating the load applied to the cutter blade 12. More specifically, for example, when the load applied to the cutter blade 12 is less than a predetermined load threshold value, the control unit 20 sets the opening degree of the lid portion 38 to 0. That is, for example, when the load applied to the cutter blade 12 is less than the predetermined load threshold value, the control unit 20 closes the lid portion 38. When the load applied to the cutter blade 12 becomes equal to or greater than the predetermined load threshold value, the control unit 20 makes the opening degree of the lid portion 38 greater than 0. That is, when the load applied to the cutter blade 12 becomes equal to or greater than the predetermined load threshold value, the control unit 20 opens the lid portion 38. The control unit 20 may set the opening degree of the lid portion 38 to an opening degree corresponding to the load applied to the cutter blade 12.

The information indicating the load applied to the cutter blade 12 is, for example, the value of the current supplied to the work motor 161, but the information is not limited thereto. The value of the current supplied to the work motor 161 is detected using a sensor such as a current sensor, for example.

Note that the load applied to the cutter blade 12 when the lawn grass 26 is wet is greater than the load applied to the cutter blade 12 when the lawn grass 26 is dry. Further, as the length of the lawn grass 26 increases, the load applied to the cutter blade 12 increases. Furthermore, as the moving speed of the lawn mower 10 increases, the load applied to the cutter blade 12 increases. Accordingly, the control unit 20 may determine the opening degree of the lid portion 38 based on information indicating at least one of the wetness of the lawn grass 26, the length of the lawn grass 26, the moving speed of the lawn mower 10, the weather, the air temperature, or the humidity.

The information indicating at least one of the wetness of the lawn grass 26, the length of the lawn grass 26, the moving speed of the lawn mower 10, the weather, the air temperature, or the humidity can be input to the control unit 20 by a user, but the present invention is not limited thereto. The information may be input, as appropriate, to the control unit 20 via a communication device (not shown) provided in the lawn mower 10. The wetness of the lawn grass 26 and the humidity may be detected by a humidity sensor (not shown). The air temperature may be detected by a temperature sensor (not shown). The moving speed of the lawn mower 10 may be acquired by a speed sensor (not shown) provided in the lawn mower 10. The length of the lawn grass 26 may be detected by image recognition processing using an image of the lawn grass 26. The image of the lawn grass 26 can be acquired by, for example, a camera (not shown) provided in the lawn mower 10.

The control unit 20 may control the motor 40 to increase the opening degree of the lid portion 38, when the amount of change per unit time in the load applied to the cutter blade 12 exceeds a predetermined amount. As a result, when the load applied to the cutter blade 12 increases, the load can be suitably reduced.

Further, the control unit 20 may determine the opening degree of the lid portion 38 based on information indicating the remaining capacity of the battery 18. For example, when the remaining capacity of the battery 18 becomes equal to or less than a remaining capacity threshold value determined in advance, the control unit 20 controls the motor 40 to open the lid portion 38. As a result, the rate of decrease in the remaining capacity of the battery 18 can be reduced. The control unit 20 may set the opening degree of the lid portion 38 to an opening degree corresponding to the remaining capacity of the battery 18. For example, the control unit 20 may increase the opening degree of the lid portion 38 as the remaining capacity of the battery 18 decreases. The information indicating the remaining capacity of the battery 18 is acquired using, for example, a voltage sensor (not shown) provided in the battery 18, but the present invention is not limited thereto.

Figure 7B:
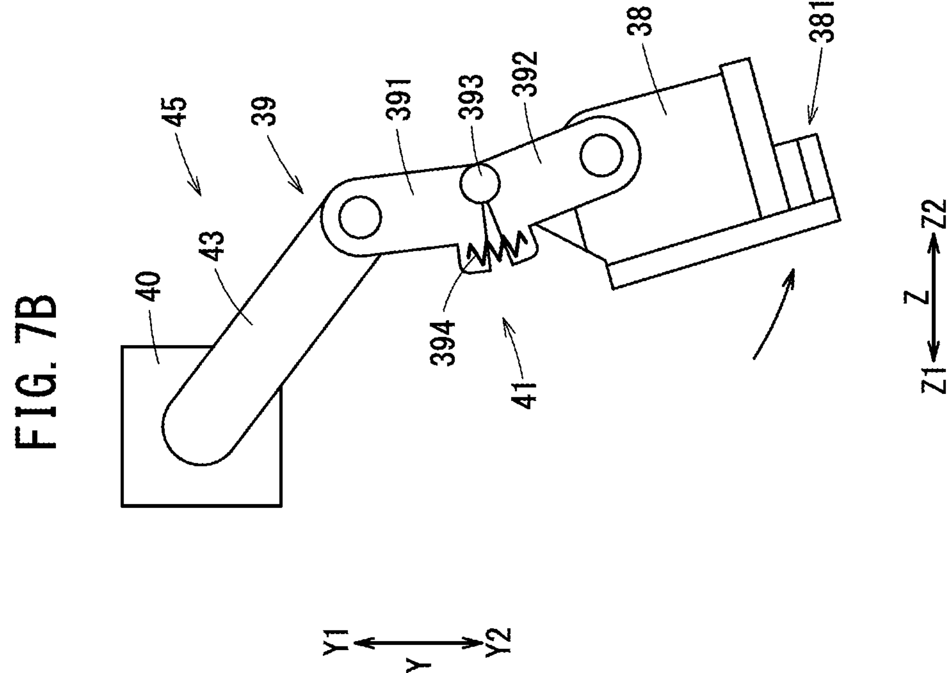
FIGS. 7A and 7B are schematic views each showing a toggle link mechanism connecting the lid portion and a motor.
Figure 7A:
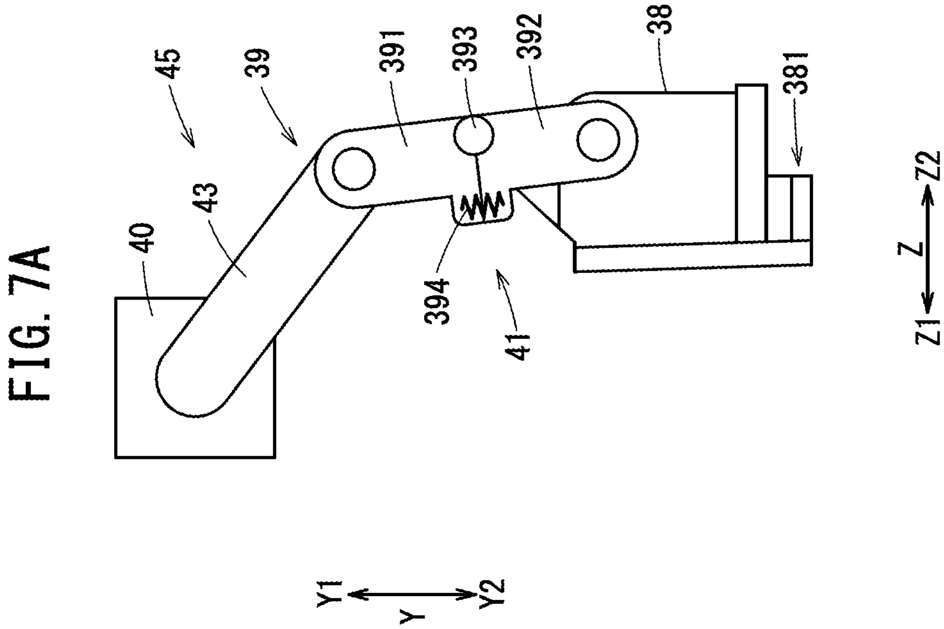

Each of FIGS. 7A and 7B is a schematic view showing the toggle link mechanism 39 connecting the lid portion 38 and the motor 40.

As described above, the lid portion 38 and the motor 40 are connected to each other via the toggle link mechanism 39. The toggle link mechanism 39 includes a first link member 391, a second link member 392, a coupling shaft member 393, and a tension biasing member 394. The tension biasing member 394 is, for example, a tension spring, but is not limited thereto.

One end of the first link member 391 is connected to the motor 40 via a transmission member 43. The other end of the first link member 391 is connected to the coupling shaft member 393 and the tension biasing member 394. The coupling shaft member 393 is located rearward of the tension biasing member 394.

One end of the second link member 392 is connected to the lid portion 38. The other end of the second link member 392 is connected to the coupling shaft member 393 and the tension biasing member 394.

The second link member 392 is rotatable about the coupling shaft member 393 relative to the first link member 391. The tension biasing member 394 applies a tensile force to the first link member 391 and the second link member 392 to prevent the second link member 392 from rotating about the coupling shaft member 393 relative to the first link member 391.

This toggle link mechanism 39 can function as a release mechanism 41 that releases the closed state of the lid portion 38 when an overload is applied to the lid portion 38 in the closed state. Specifically, when the lawn mower 10 is moving, the lid portion 38 may come into contact with an obstacle located in front of the lid portion 38. The obstacle is, for example, a stone. If the lawn mower 10 moves forward with the obstacle abutting against the front surface of the lid portion 38 in the closed state, an external force in the rearward direction Z2 is applied to the lid portion 38. In response to the external force, the second link member 392 rotates about the coupling shaft member 393. Since the toggle link mechanism 39 configured in this manner is provided, when the obstacle comes into contact with the lid portion 38, the lid portion 38 can be opened without driving the motor 40 (see also FIG. 7B). In other words, the closed state of the lid portion 38 can be released in response to the external force in the rearward direction Z2 applied from the obstacle. As a result, it is possible to reduce a risk that the lid portion 38 will be damaged or deformed due to contact with the obstacle.

Note that, when the lawn mower 10 moves forward and the lid portion 38 is positioned in front of the obstacle, the second link member 392 can return to its original state by the tensile force applied from the above-described tension biasing member 394 (see also FIG. 7A). That is, since the toggle link mechanism 39 configured in this manner is provided, when the lid portion 38 is positioned in front of the obstacle, the lid portion 38 can be returned to the closed state without driving the motor 40.

The protruding portion 32 protrudes in the forward direction Z1 from the blade accommodating portion 30. The protruding portion 32 includes two side wall portions 32*s* (32*s*1, 32*s*2), a front wall portion 32*f*, and an upper wall portion 32*u* (see also FIGS. 2 and 3). The two side wall portions 32*s* include a first side wall portion 32*s*1 and a second side wall portion 32*s*2. The front wall portion 32*f* includes a protruding end 32*p* of the protruding portion 32. The shape of the protruding portion 32 in plan view (top view) is substantially rectangular, but the shape of the protruding portion 32 is not limited thereto. A lower portion 32*b* of the protruding portion 32 is open.

The first side wall portion 32*s*1 and the second side wall portion 32*s*2 face each other in the width direction X, and extend in the forward direction Z1. The first side wall portion 32*s*1 is located on one side of a center line LC of the lawn mower 10. The second side wall portion 32*s*2 is located on the other side of the center line LC of the lawn mower 10. The center line LC is an imaginary straight line extending parallel to the front-rear direction Z and intersecting the rotation axis A12 of the cutter blade 12. A front end 44 of the first side wall portion 32*s*1 and a front end 46 of the second side wall portion 32*s*2 are connected to the front wall portion 32*f*. A rear end 48 of the first side wall portion 32*s*1 is connected to a front end 50 of the side wall portion 30*s*1 of the blade accommodating portion 30. A rear end 52 of the second side wall portion 32*s*2 is connected to a front end 54 of the side wall portion 30*s*2 of the blade accommodating portion 30.

The upper wall portion 32*u* is connected to the first side wall portion 32*s*1, the second side wall portion 32*s*2, the front wall portion 32*f*, and the upper wall portion 30*u* of the blade accommodating portion 30.

Figure 8:
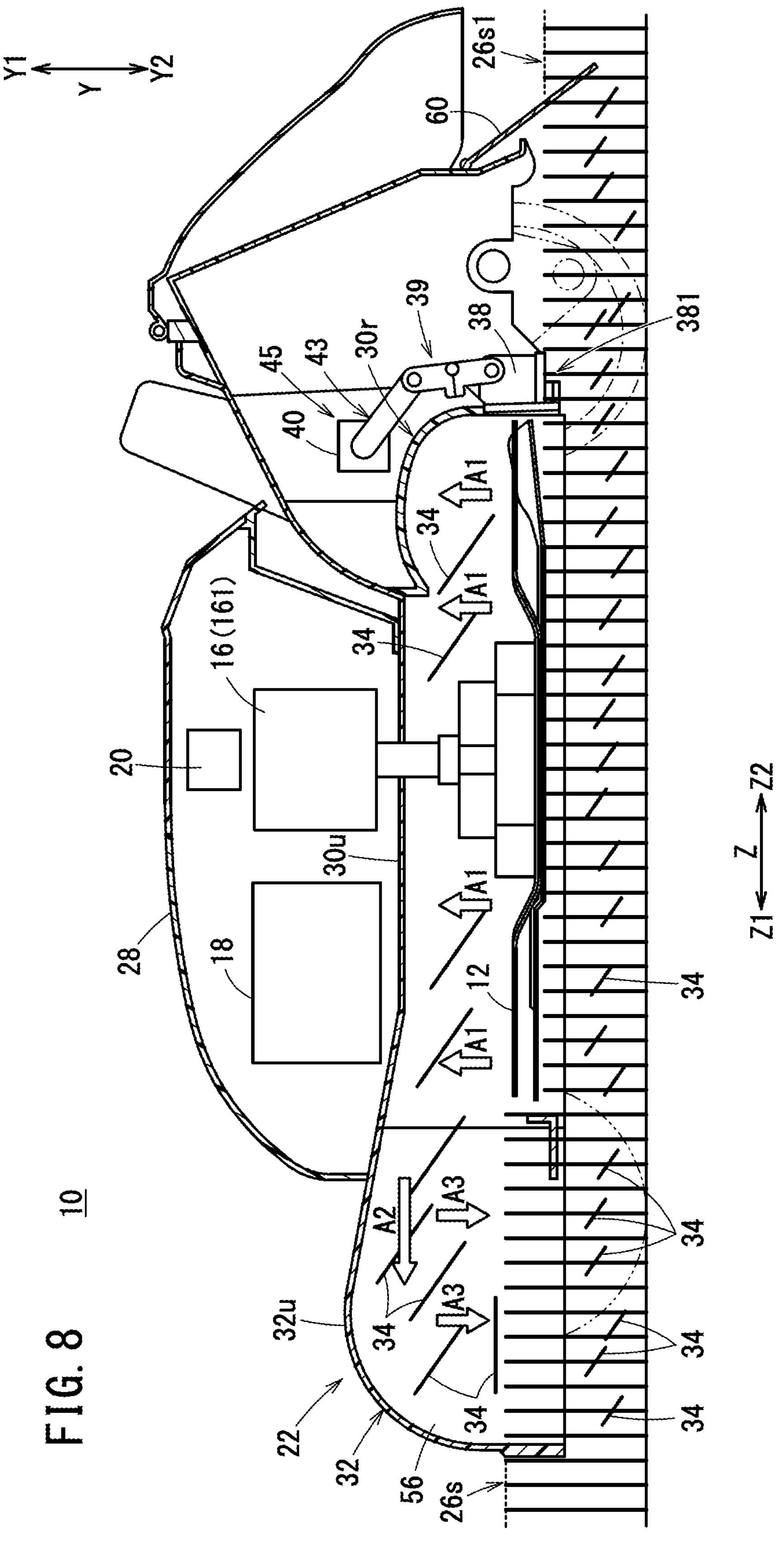
FIG. 8 is a schematic view showing the flow of grass clippings.

FIG. 8 is a schematic view showing the flow of the grass clippings 34.

The above-described protruding portion 32 communicates with the blade accommodating portion 30. In other words, the blade accommodating portion 30 and the protruding portion 32 form one space 56. The above-described airflow A1 flowing in the upward direction Y1 is generated in the space 56.

The airflow A1 collides with the upper wall portion 30*u* of the blade accommodating portion 30 and becomes an airflow A2 flowing in the forward direction Z1. The grass clippings 34 cut by the cutter blade 12 flow into the protruding portion 32 from the blade accommodating portion 30 by the airflow A2.

The airflow A2 collides with the front wall portion 32*f* or the side wall portions 32*s* and becomes an airflow A3 flowing in the downward direction Y2. As described above, the lower portion 32*b* of the protruding portion 32 is open. Therefore, the grass clippings 34 in the protruding portion 32 fall onto grass surfaces 26*s* in front of the cutter blade 12 by the airflow A3.

The grass clippings 34 sufficiently finely chopped by the cutter blade 12 can pass through the grass surfaces 26*s* and fall below the grass surfaces 26*s*. Since the grass clippings 34 entering below the grass surfaces 26*s* are inconspicuous, the appearance of the grass surfaces 26*s*1 after the lawn grass 26 is cut is not impaired.

On the other hand, the grass clippings 34 having not been sufficiently finely chopped adhere, in the protruding portion 32, to the grass surfaces 26*s* before being cut. Since the lawn mower 10 moves forward, the grass clippings 34 adhering to the grass surfaces 26*s* in the protruding portion 32 are cut again by the cutter blade 12. As a result, the grass clippings 34 adhering to the grass surfaces 26*s* are more finely chopped.

In this manner, according to the present embodiment, the grass clippings 34 flow to the area in front of the cutter blade 12. Therefore, by simply moving forward while driving the cutter blade 12, the lawn mower 10 can continue to chop the grass clippings 34 to such an extent that the grass clippings 34 can enter below the grass surfaces 26*s*. Therefore, the grass clippings 34 are less likely to remain on the grass surfaces 26*s*1 after the lawn mower 10 has passed.

In order to cut the lawn grass 26 more efficiently, the following structure is applied to the lawn mower 10.

The distance between the first side wall portion 32*s*1 and the second side wall portion 32*s*2 is smaller than a dimension L12 of the cutter blade 12 in the longitudinal direction. That is, as shown in FIG. 2, the width (inner width) W32, which is the dimension of the protruding portion 32 in the width direction X, is smaller than the dimension L12 of the cutter blade 12 in the longitudinal direction (W32<L12). With this configuration, the grass clippings 34 falling on the grass surfaces 26*s* in the protruding portion 32 can be reliably positioned within the cutting range of the cutter blade 12.

A dimension L321 of the first side wall portion 32*s*1 in the front-rear direction Z is greater than a dimension L322 of the second side wall portion 32*s*2 in the front-rear direction Z (L321>L322). The rear end 48 of the first side wall portion 32*s*1 is positioned rearward of the rear end 52 of the second side wall portion 32*s*2 in the front-rear direction Z. As a result, a larger amount of the grass clippings 34 can be received by the first side wall portion 32*s*1. By causing the grass clippings 34 to collide with the first side wall portion 32*s*1, the grass clippings 34 can be caused to fall more reliably. In addition, the second side wall portion 32*s*2 becomes less likely to inhibit the flow of the grass clippings 34 toward the first side wall portion 32*s*1.

In a state where the longitudinal direction of the cutter blade 12 coincides with the front-rear direction Z, the rear end 48 of the first side wall portion 32*s*1 and a part of the cutter blade 12 overlap each other in side view. On the other hand, even in a state where the longitudinal direction of the cutter blade 12 coincides with the front-rear direction Z, the rear end 52 of the second side wall portion 32*s*2 and the cutter blade 12 do not overlap each other in side view. This makes it easier for the grass clippings 34 to collide with the first side wall portion 32*s*1. In addition, the second side wall portion 32*s*2 becomes further less likely to inhibit the flow of the grass clippings 34 toward the first side wall portion 32*s*1. Note that the longitudinal direction of the cutter blade 12 in FIG. 2 coincides with the front-rear direction Z.

The distance between the cutter blade 12 and the rear end 48 of the first side wall portion 32*s*1 when the cutter blade 12 and the rear end 48 of the first side wall portion 32*s*1 are closest to each other is defined as a first distance D1. Further, the distance between the cutter blade 12 and the rear end 52 of the second side wall portion 32*s*2 when the cutter blade 12 and the rear end 52 of the second side wall portion 32*s*2 are closest to each other is defined as a second distance D2. The second distance D2 is greater than the first distance D1 (D2>D1). With this configuration, the second side wall portion 32*s*2 becomes further less likely to inhibit the flow of the grass clippings 34 toward the first side wall portion 32*s*1.

A distance DZ in the front-rear direction Z between the rotation axis A12 of the cutter blade 12 and the protruding end 32*p* of the protruding portion 32 is greater than a distance DX in the width direction X between the rotation axis A12 and the inner wall of the blade accommodating portion 30 (DZ>DX). Thus, the protruding portion 32 can accommodate a large amount of the grass clippings 34. As a result, the amount of the grass clippings 34 staying in the blade accommodating portion 30 is reduced. The load applied to the cutter blade 12 is suppressed by reducing the amount of the grass clippings 34 staying in the blade accommodating portion 30. By reducing the load applied to the cutter blade 12, the power consumption of the lawn mower 10 is reduced.

A protruding length L32 of the protruding portion 32 is preferably one third or more of the dimension L12 of the cutter blade 12 in the longitudinal direction (L32≥L12/3). The protruding length L32 of the protruding portion 32 is more preferably one half or more of the dimension L12 of the cutter blade 12 in the longitudinal direction (L32≥L12/2). Thus, the protruding portion 32 can accommodate a larger amount of the grass clippings 34. The protruding length L32 of the protruding portion 32 is a distance in the front-rear direction Z between the front end of the cutter blade 12 and the protruding end 32*p* of the protruding portion 32 in a state where the longitudinal direction of the cutter blade 12 coincides with the front-rear direction Z.

When the housing 22 is not provided with the protruding portion 32, the amount of the grass clippings 34 staying in the blade accommodating portion 30 is likely to increase. Therefore, when the housing 22 is not provided with the protruding portion 32, the load applied to the cutter blade 12 is likely to increase. As a result, when the housing 22 is not provided with the protruding portion 32, the power consumption of the lawn mower 10 is likely to increase.

On the other hand, in the present embodiment, the grass clippings 34 flow into the protruding portion 32 from the blade accommodating portion 30. Therefore, according to the present embodiment, it is possible to reduce the amount of the grass clippings 34 staying in the blade accommodating portion 30. As a result, according to the present embodiment, the power consumption of the lawn mower 10 can be suppressed.

Further, in the present embodiment, the grass clippings 34 that have been sufficiently finely chopped fall below the grass surfaces 26*s*. The grass clippings 34 that have fallen below the grass surfaces 26*s* are less likely to contact the cutter blade 12. In other words, the grass clippings 34 that have fallen below the grass surfaces 26*s* are less likely to apply a load to the cutter blade 12. Therefore, according to the present embodiment, the power consumption of the lawn mower 10 can be further suppressed.

Moreover, as described above, the lawn mower 10 of the present embodiment is provided with the discharge unit 36. When the load on the cutter blade 12 increases to some extent, the lid portion 38 is opened by the control unit 20. As a result, the grass clippings 34 can be discharged from the blade accommodating portion 30 to the rear of the lawn mower 10, thereby reducing the load on the cutter blade 12. That is, the power consumption of the lawn mower 10 can be suppressed.

The lawn mower 10 further includes a rib 58 and a grass dropper 60.

The rib 58 is a member that extends in the width direction X and connects the first side wall portion 32*s*1 and the second side wall portion 32*s*2 of the protruding portion 32. By connecting the first side wall portion 32*s*1 and the second side wall portion 32*s*2 with the rib 58, bending of the protruding portion 32 is suppressed.

The grass dropper 60 is disposed rearward of the housing 22. The grass dropper 60 includes, for example, a plate-shaped member or a brush member. The grass dropper 60 shown in FIG. 3 includes a plate-shaped member. The grass dropper 60 drops the grass clippings 34 adhering to the grass surfaces 26*s*1 after mowing, from the grass surfaces 26*s*1. As a result, the grass surfaces 26*s*1 after mowing can be adjusted.

The above embodiment may be modified in the following manner. In the following modifications, description overlapping with that of the embodiment will be omitted. Further, in the drawings used in the following modifications, the same components as those described in the embodiment are denoted by the same reference numerals.

(Modification 1)

Figure 9:
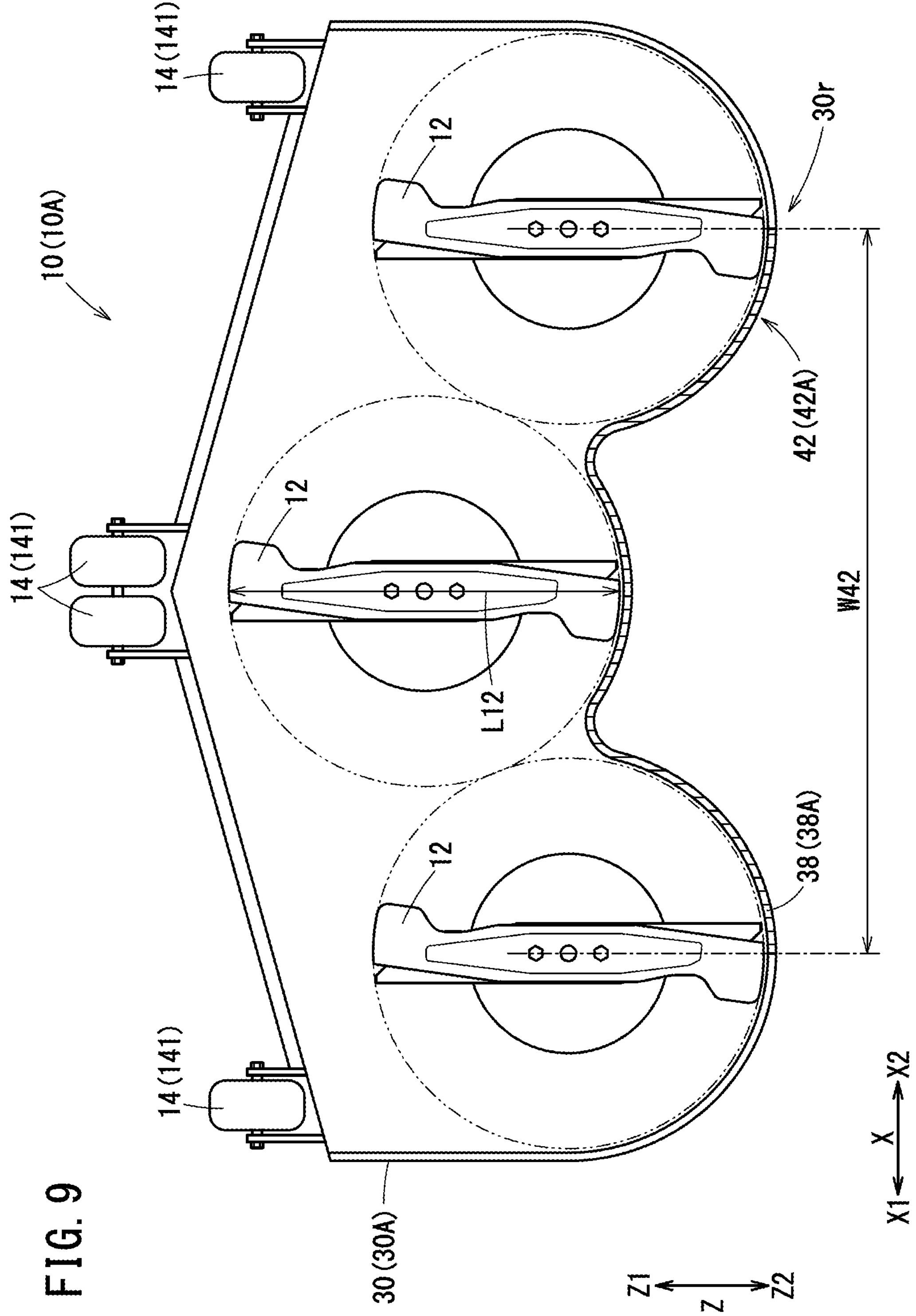
FIG. 9 is a bottom view of a lawn mower according to a first modification.

FIG. 9 is a bottom view of a lawn mower 10 (10A) according to a first modification.

The lawn mower 10A is provided with a plurality of cutter blades 12. The cutter blades 12 are accommodated in a blade accommodating portion 30 (30A) provided in the lawn mower 10A. Although three cutter blades 12 are shown in FIG. 9, the number of the cutter blades 12 is not limited to three.

The plurality of cutter blades 12 are arranged side by side in the width direction X. As a result, the lawn mower 10A can cut a wider range of the lawn grass 26 than the lawn mower 10 (FIG. 1) described in the above embodiment. The specific arrangement of the plurality of cutter blades 12 is not limited to that illustrated in FIG. 9.

An opening 42 (42A) is formed in the rear portion 30*r* of the blade accommodating portion 30A. It is preferable that a width W42 of the opening 42A in the width direction X is relatively large. Specifically, it is preferable that the width W42 of the opening 42A in the width direction X is set to be larger than the cutting range of one cutter blade 12. That is, it is preferable that the width W42 of the opening 42A in the width direction X is set to be larger than the dimension L12 of one cutter blade 12 in the longitudinal direction.

It is more preferable that the width W42 of the opening 42A in the width direction X overlaps the rotation trajectories (RT) of the two cutter blades 12 in rear view of the lawn mower 10A. If the width W42 of the opening 42A in the width direction X is set to be sufficiently large in this manner, then even when the grass clippings 34 cut by the plurality of cutter blades 12 are discharged from one opening 42A, the grass clippings 34 are unlikely to clog the opening 42A.

Further, in the present modification, the number of a lid portion 38 (38A) provided in the opening 42A is one. Therefore, only one motor 40 is required to open and close the lid portion 38A. In other words, it is not necessary to increase the number of the motors 40 in proportion to the number of the cutter blades 12. As a result, energy consumption required for opening and closing the lid portion 38A can be suppressed.

Note that the control unit 20 can open and close the lid portion 38A based on loads applied to the plurality of cutter blades 12. For example, the control unit 20 may open and close the lid portion 38A based on a total value, a mean value, or the like of the loads applied to the plurality of cutter blades 12.

(Modification 2)

Figure 10:
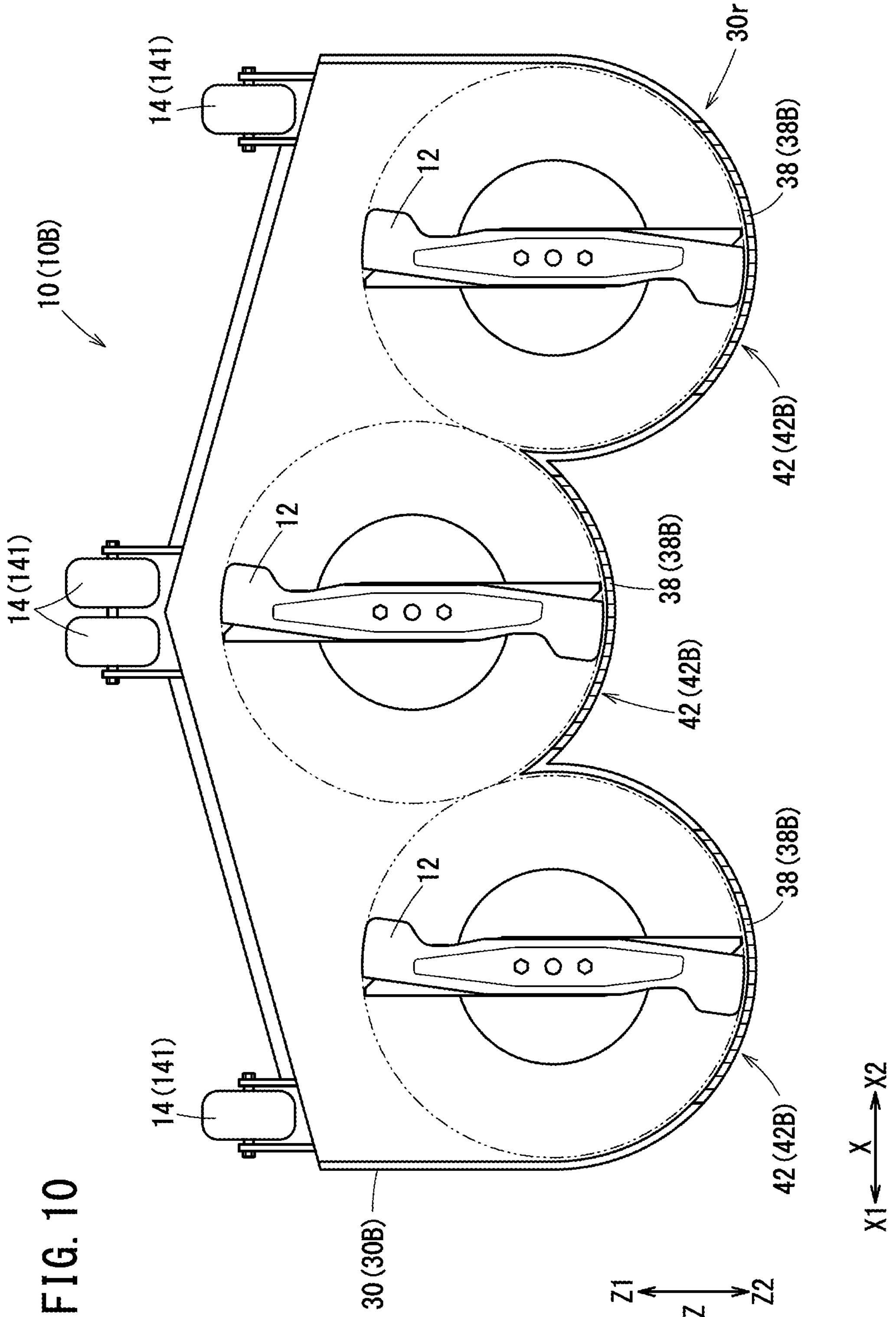
FIG. 10 is a bottom view of a lawn mower according to a second modification.

FIG. 10 is a bottom view of a lawn mower 10 (10B) according to a second modification.

The lawn mower 10B includes a plurality of cutter blades 12 and a blade accommodating portion 30 (30B). The plurality of cutter blades 12 are accommodated in the blade accommodating portion 30B.

A plurality of openings 42 (42B) are formed in the blade accommodating portion 30B. That is, the opening 42B is formed for each of the plurality of cutter blades 12. The opening 42B is located rearward of the cutter blade 12.

The lawn mower 10B further includes a plurality of lid portions 38 (38B). The lid portion 38B is provided for each of the plurality of openings 42B. Further, the plurality of lid portions 38B can be individually opened and closed by different motors 40 (not shown in FIG. 10). According to the present modification, the load applied to each of the plurality of cutter blades 12 can be individually reduced.

(Modification 3)

The width W42 of the opening 42 described above may be equal to or larger than the cutting range (L12) of the cutter blade 12 in the width direction X. This makes it easier for the grass clippings 34 to pass through the opening 42.

(Modification 4)

The protruding portion 32 protruding in the forward direction Z1 from the blade accommodating portion 30 may be omitted.

(Modification 5)

The member that connects the lid portion 38 and the motor 40 is not limited to the toggle link mechanism 39. For example, the lid portion 38 and the motor 40 may be connected to each other via a gear or the like. Alternatively, the lid portion 38 and the motor 40 may be directly connected to each other.

(Combination of Plurality of Modifications)

The plurality of modifications described above may be appropriately combined.

APPENDICES

The following notes (appendices) are further disclosed in relation to the above-described embodiment and modifications.

Appendix 1

The lawn mower (10) according to the present disclosure includes: the cutter blade (12) configured to cut the lawn grass (26); the drive source (16) configured to rotate the cutter blade; the blade accommodating portion (30) that is configured to accommodate the cutter blade and is provided with the opening (42) in the rear portion (30*r*) thereof; and the lid portion (38) provided at the opening in an openable and closable manner. According to this feature, the lawn mower capable of more efficiently mowing the lawn grass is provided.

Appendix 2

In the lawn mower according to Appendix 1, the lid portion may be curved to correspond to the rotation trajectory (RT) of the cutter blade. According to this feature, it is possible to reduce the risk that the grass clippings flowing in the blade accommodating portion will get jammed between the blade accommodating portion and the lid portion.

Appendix 3

In the lawn mower according to Appendix 1 or 2, the lid portion may open and close by rotating about the rotation axis (A38) extending in the width direction (X) of the lawn mower.

Appendix 4

The lawn mower according to Appendix 3 may further include the release mechanism (41) configured to, when an overload is applied to the lid portion in a closed state, release the closed state of the lid portion. According to this feature, the lid portion can be opened when an overload is applied to the lid portion.

Appendix 5

In the lawn mower according to any one of Appendices 1 to 4, the lid portion may be provided with the plurality of protrusions (381) protruding downward. According to this feature, the appearance of the grass surfaces after mowing with the lawn mower can be improved.

Appendix 6

In the lawn mower according to any one of Appendices 1 to 5, when the lid portion is in the closed state, the inner wall surface of the blade accommodating portion and the inner wall surface of the lid portion may be flush with each other. According to this feature, it is possible to further reduce the risk that the grass clippings flowing in the blade accommodating portion will get jammed between the blade accommodating portion and the lid portion.

Appendix 7

The lawn mower according to any one of Appendices 1 to 6 may further include the two wheels (14) arranged at an interval in the width direction of the lawn mower, and the opening may be located between the two wheels. According to this feature, the lawn mower can be configured to be compact.

Appendix 8

In the lawn mower according to any one of Appendices 1 to 7, the dimension (W42) of the opening in the width direction of the lawn mower may be one half or more of the cutting range (L12) of the cutter blade in the width direction. According to this feature, the grass clippings can be easily discharged from the opening.

Appendix 9

In the lawn mower according to Appendix 8, the dimension of the opening in the width direction of the lawn mower may be equal to or larger than the cutting range of the cutter blade in the width direction. According to this feature, the grass clippings can be more easily discharged from the opening.

Appendix 10

In the lawn mower according to Appendix 8 or 9, the cutter blade may be provided in plurality, the plurality of cutter blades may be arranged side by side in the width direction, and the dimension of the opening in the width direction may be larger than the cutting range of at least one of the plurality of cutter blades. According to this feature, even when the number of the cutter blades is plural, the grass clippings can be suitably discharged through one opening.

Appendix 11

The lawn mower according to any one of Appendices 1 to 10 may further include: the actuator (45) configured to open and close the lid portion; and the control unit (20) configured to determine the opening degree of the lid portion based on the information indicating at least one of the load applied to the cutter blade, wetness of the lawn grass cut by the cutter blade, the length of the lawn grass, the moving speed of the lawn mower, the weather, the air temperature, the humidity, or the remaining capacity of the battery (18) provided in the lawn mower, the control unit controlling the actuator based on the determined opening degree. According to this feature, the load on the cutter blade can be automatically reduced.

Appendix 12

In the lawn mower according to Appendix 11, the control unit may control the actuator to increase the opening degree of the lid portion when the change amount per unit time in the load exceeds the predetermined amount. According to this feature, when the load applied to the cutter blade increases, the load can be reduced.

Appendix 13

In the lawn mower according to Appendix 11 or 12, the control unit may control the actuator to open the lid portion when the remaining capacity of the battery becomes equal to or less than the remaining capacity threshold value determined in advance. According to this feature, when the remaining capacity of the battery is decreased to a certain level, the rate of decrease of the remaining capacity can be reduced.

It should be noted that the present invention is not limited to the disclosure described above, and various configurations can be adopted therein without departing from the essence and gist of the present invention.

The invention claimed is:

1. A lawn mower, comprising:

a cutter blade configured to cut lawn grass;

a drive source configured to rotate the cutter blade;

a blade accommodating portion that is configured to accommodate the cutter blade and is provided with an opening in a rear portion thereof;

a lid portion provided at the opening in an openable and closable manner;

an actuator configured to open and close the lid portion; and a release mechanism configured to, when an overload caused by an external force in a rearward direction is applied to the lid portion in a closed state, release the closed state of the lid portion; and, a control unit configured to determine an opening degree of the lid portion based on information indicating at least one of a load applied to the cutter blade, wetness of the lawn grass cut by the cutter blade, a length of the lawn grass, a moving speed of the lawn mower, weather, air temperature, humidity, or a remaining capacity of a battery provided in the lawn mower, the control unit controlling the actuator based on the determined opening degree.

2. The lawn mower according to claim 1, wherein the lid portion is curved to correspond to a rotation trajectory of the cutter blade.

3. The lawn mower according to claim 1, wherein the lid portion opens and closes by rotating about a rotation axis extending in a width direction of the lawn mower.

4. The lawn mower according to claim 1, wherein the lid portion is provided with a plurality of protrusions protruding downward.

5. The lawn mower according to claim 1, wherein when the lid portion is in a closed state, an inner wall surface of the blade accommodating portion and an inner wall surface of the lid portion are flush with each other.

6. The lawn mower according to claim 1, further comprising two wheels arranged at an interval in a width direction of the lawn mower, wherein the opening is located between the two wheels.

7. The lawn mower according to claim 1, wherein a dimension of the opening in a width direction of the lawn mower is one half or more of a cutting range of the cutter blade in the width direction.

8. The lawn mower according to claim 7, wherein the dimension of the opening in the width direction of the lawn mower is equal to or larger than the cutting range of the cutter blade in the width direction.

9. The lawn mower according to claim 7, wherein the cutter blade is provided in plurality, the plurality of cutter blades are arranged side by side in the width direction, and the dimension of the opening in the width direction is larger than the cutting range of at least one of the plurality of cutter blades.

10. The lawn mower according to claim 1, wherein the control unit controls the actuator to increase the opening degree of the lid portion when a change amount per unit time in the load exceeds a predetermined amount.

11. The lawn mower according to claim 1, wherein the control unit controls the actuator to open the lid portion when the remaining capacity of the battery becomes equal to or less than a remaining capacity threshold value determined in advance.

* * * * *